United States Patent
Kingsford et al.

(10) Patent No.: US 9,605,669 B2
(45) Date of Patent: Mar. 28, 2017

(54) MULTI-PORT METERING PUMP ASSEMBLY AND RELATED METHODS

(71) Applicant: Simmons Development LLC, Salt Lake City, UT (US)

(72) Inventors: Kenji Allen Kingsford, Oro Valley, AZ (US); Tom M. Simmons, Kamas, UT (US); Ervin Andy Hutchinson, Morgan, UT (US); Courtney Parsons, Taylorsville, UT (US)

(73) Assignee: Graco Fluid Handling (A) Inc., Kamas, UT (US)

( * ) Notice: Subject to any disclaimer, the term of this patent is extended or adjusted under 35 U.S.C. 154(b) by 87 days.

(21) Appl. No.: 14/219,861

(22) Filed: Mar. 19, 2014

(65) Prior Publication Data
US 2015/0267696 A1   Sep. 24, 2015

(51) Int. Cl.
*F04B 13/00* (2006.01)
*B05B 7/14* (2006.01)
(Continued)

(52) U.S. Cl.
CPC .......... *F04B 49/065* (2013.01); *B05B 7/1459* (2013.01); *B05C 5/0279* (2013.01);
(Continued)

(58) Field of Classification Search
CPC .......... F04B 7/02; F04B 7/0038; F04B 13/00; F04B 43/02; F04B 43/04; F04B 43/06;
(Continued)

(56) References Cited

U.S. PATENT DOCUMENTS 5,088,515 A * 2/1992 Kamen ................. A61M 39/22
137/15.17
6,729,364 B2   5/2004 Few et al.
(Continued)

FOREIGN PATENT DOCUMENTS

TW   381300 B   2/2000

OTHER PUBLICATIONS

International Search Report for International Application No. PCT/US2015/021575, dated Jul. 16, 2015, 4 pages.
(Continued)

*Primary Examiner* — Peter J Bertheaud
(74) *Attorney, Agent, or Firm* — TraskBritt

(57) ABSTRACT

A multi-port metering pump assembly includes a manifold coupled to a metering pump. The manifold defines a central passage in fluid communication with a plurality of intermediate passages defined in the manifold. The manifold includes a plurality of outer passages. Each intermediate passage provides fluid communication between the central passage and a corresponding outer passage. A plurality of valves is coupled to the manifold. Each valve of the plurality of valves is located between an intermediate passage and a corresponding outer passage, and is configured to enable or prevent passage of fluid between a corresponding intermediate passage of the plurality of intermediate passages and a corresponding outer passage. The multi-port metering pump assembly also includes an electronic controller coupled to the plurality of valves, the electronic controller having an associated electronic interface and being programmable to selectively and independently open and close the valves of the plurality of valves.

20 Claims, 6 Drawing Sheets

(51) Int. Cl.
- *B65G 53/28* (2006.01)
- *F04B 49/06* (2006.01)
- *F04B 7/00* (2006.01)
- *F04B 7/02* (2006.01)
- *F04B 49/22* (2006.01)
- *B05C 5/02* (2006.01)

(52) U.S. Cl.
CPC ............ *B65G 53/28* (2013.01); *F04B 7/0038* (2013.01); *F04B 7/02* (2013.01); *F04B 13/00* (2013.01); *F04B 49/22* (2013.01); *Y10T 29/49002* (2015.01)

(58) Field of Classification Search
CPC ........ F04B 45/04; F04B 49/22; F04B 49/225; B05C 5/0225; B05C 5/0237; B05C 5/0275; B05C 5/0279; B65G 53/28
USPC ........................................ 417/502, 506, 510
See application file for complete search history.

(56) References Cited

U.S. PATENT DOCUMENTS

| | | | |
|---|---|---|---|
| 7,537,437 B2* | 5/2009 | Muramatsu | F04B 17/042 417/356 |
| 7,770,760 B2 | 8/2010 | McGuffey et al. | |
| 7,997,878 B2* | 8/2011 | Fulkerson | B05B 7/1459 417/65 |
| 2005/0129584 A1 | 6/2005 | Johnson et al. | |
| 2006/0060611 A1 | 3/2006 | Wichmann | |
| 2007/0258837 A1* | 11/2007 | Okumura | F04B 43/06 417/472 |
| 2011/0052811 A1 | 3/2011 | McGuffey | |

OTHER PUBLICATIONS

Written Opinion of the International Search Authority for International Application No. PCT/US2015/021575, dated Jul. 16, 2015, 5 pages.

* cited by examiner

MULTI-PORT METERING PUMP ASSEMBLY AND RELATED METHODS

FIELD

Embodiments of the present disclosure relate generally to metering pump assemblies that have multiple output ports, and to methods of fabricating such multi-port metering pump assemblies.

BACKGROUND

Metering pumps are used in numerous types of fluid delivery systems where precise volumes of fluid, including water, chemicals, solutions, or other fluids, must be delivered on demand. Metering pumps typically discharge a known volume of fluid with every pump cycle or revolution. Accordingly, by controlling the number of cycles or revolutions of the metering pump, the volume of fluid dispensed from the metering pump may also be controlled. Additionally, by controlling the cycle speed or revolution speed of the metering pump, the flow rate of the metering pump may also be controlled. If the cycle speed or revolution speed of a metering pump is constant, the flow rate is generally constant as well. Metering pumps are often configured as piston pumps, diaphragm pumps, gear pumps, or peristaltic pumps. Applications that utilize the precise volumetric output dispensed by metering pumps include those in the semiconductor industry, the medical field, water treatment, chemical processing, instrumentation and laboratory dispensing. In some applications, metering pumps may be required to dispense ultra-high purity fluids.

BRIEF SUMMARY

In some embodiments, a multi-port metering pump assembly may include a metering pump and a manifold coupled to the metering pump. The manifold may define a central passage in fluid communication with a plurality of intermediate passages defined in the manifold. Each intermediate passage of the plurality of intermediate passages may provide fluid communication between the central passage of the metering pump and a corresponding outer passage of the manifold. The multi-port metering pump assembly may include a plurality of valves coupled to the manifold. Each valve of the plurality of valves may be located between an intermediate passage of the plurality of intermediate passages and a corresponding outer passage, and each valve may be configured to enable and prevent passage of fluid pressurized by the pump between a corresponding intermediate passage of the plurality of intermediate passages and a corresponding outer passage. The multi-port metering pump assembly may also include an electronic controller coupled to the plurality of valves. The electronic controller may have an associated electronic interface and may be programmed to selectively and independently open and close the valves of the plurality of valves.

In other embodiments, a method of manufacturing a multi-port metering pump assembly may include providing a metering pump and coupling a manifold to the metering pump. The manifold define a central passage in fluid communication with intermediate passages defined in the manifold, wherein each intermediate passage provides fluid communication between the central passage and a corresponding outer passage. The method may include locating a valve between each intermediate passage and a corresponding outer passage. Each valve may be configured to enable and prevent passage of fluid pressurized by the pump between a corresponding intermediate passage of the plurality of intermediate passages and a corresponding outer passage. The method may include operably coupling an electronic controller having an associated electronic interface to each valve, the electronic controller programmable to selectively and independently open and close the valves.

BRIEF DESCRIPTION OF THE DRAWINGS

While the disclosure concludes with claims particularly pointing out and distinctly claiming specific embodiments, various features and advantages of embodiments of the disclosure may be more readily ascertained from the following description when read in conjunction with the accompanying drawings, in which:

DETAILED DESCRIPTION

The illustrations presented herein are not meant to be actual views of any particular pump assembly, metering pump, valve assembly, or component thereof, but are merely idealized representations employed to describe illustrative embodiments.

Figure 1:
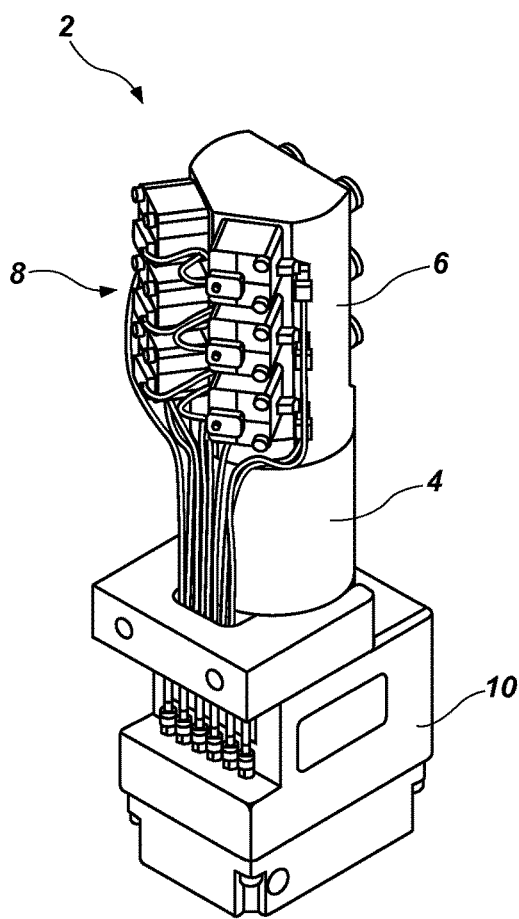
FIG. 1 illustrates a perspective view of a metering pump assembly, according to an embodiment of the present disclosure.
Figure 2:
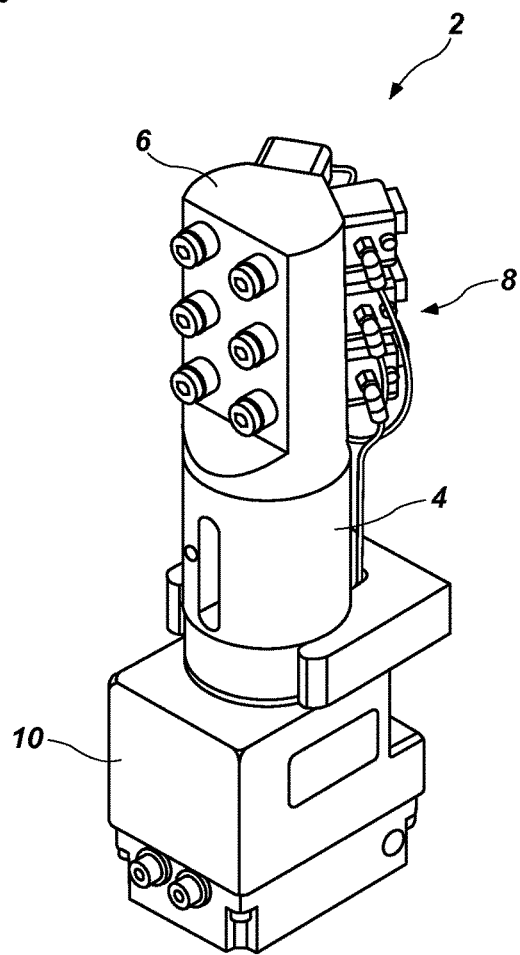
FIG. 2 illustrates an additional perspective view of the metering pump assembly of FIG. 1.

FIGS. 1 and 2 illustrate a multi-port metering pump assembly 2 having a pump unit 4 attached to a manifold 6. The pump unit 4 may house a pump (not shown) for dispensing precise volumes of fluid. It is to be appreciated that the pump may be any type of pump for dispensing precise volumes of fluid. Such pumps, as noted above, may be characterized as metering pumps. The pump may be a piston-type pump, a diaphragm-type pump, a gear-type pump, a peristaltic pump, or a combination thereof. The pump is discussed in more detail below. The manifold 6 may define a plurality of intermediate passages in fluid communication with a single central passage extending from the metering pump, as described in more detail below. A plurality of valves 8 may be coupled to the manifold 6 and may be configured to selectively control discharge of fluid from individual intermediate passages of the manifold 6. A valve control unit 10 may be coupled to the pump unit 4 and may be configured to control operation of valves of the plurality of valves 8.

Figure 3:
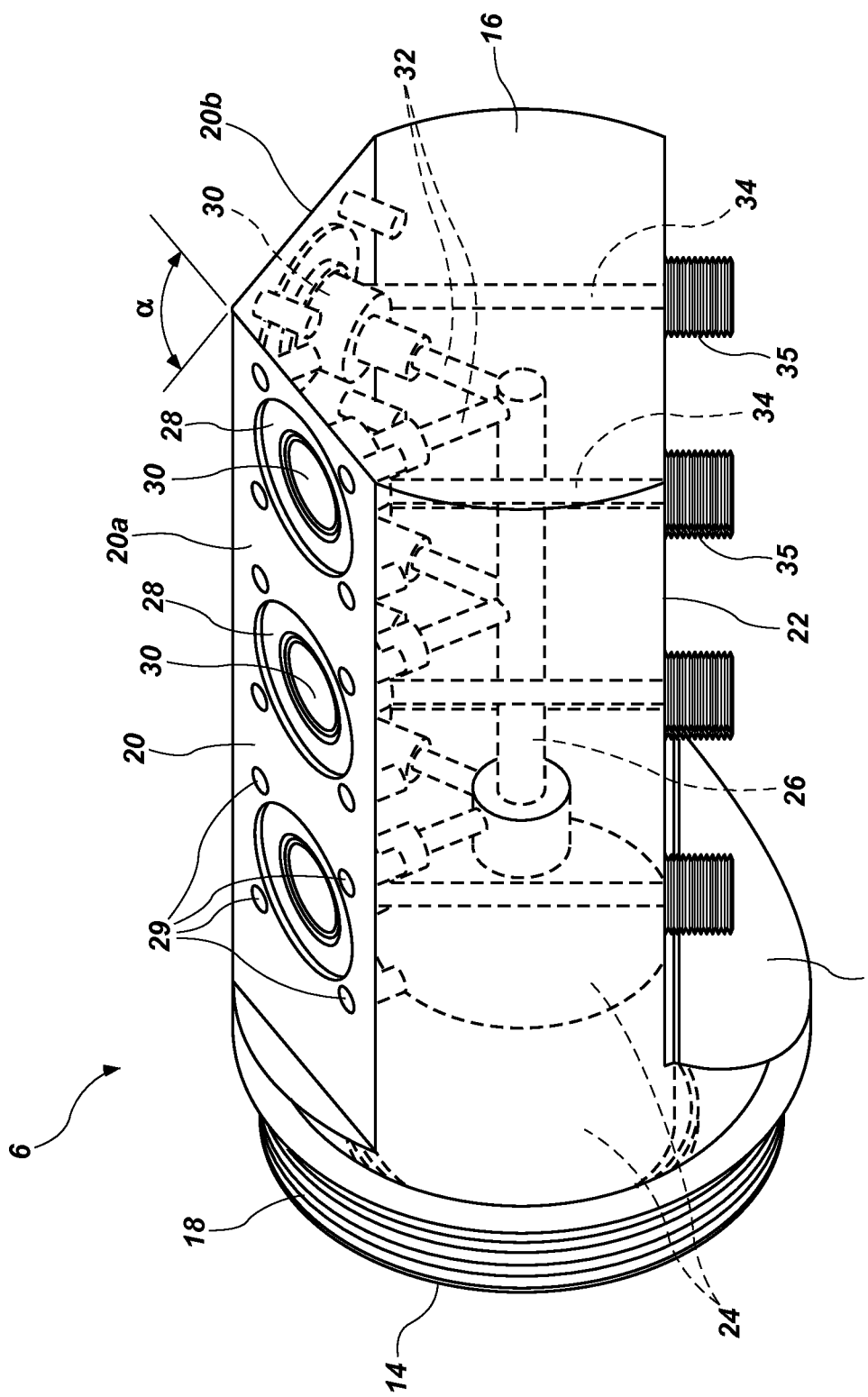
FIG. 3 illustrates a semi-transparent, perspective view of a manifold of the metering pump assembly of FIGS. 1 and 2.
Figure 4:
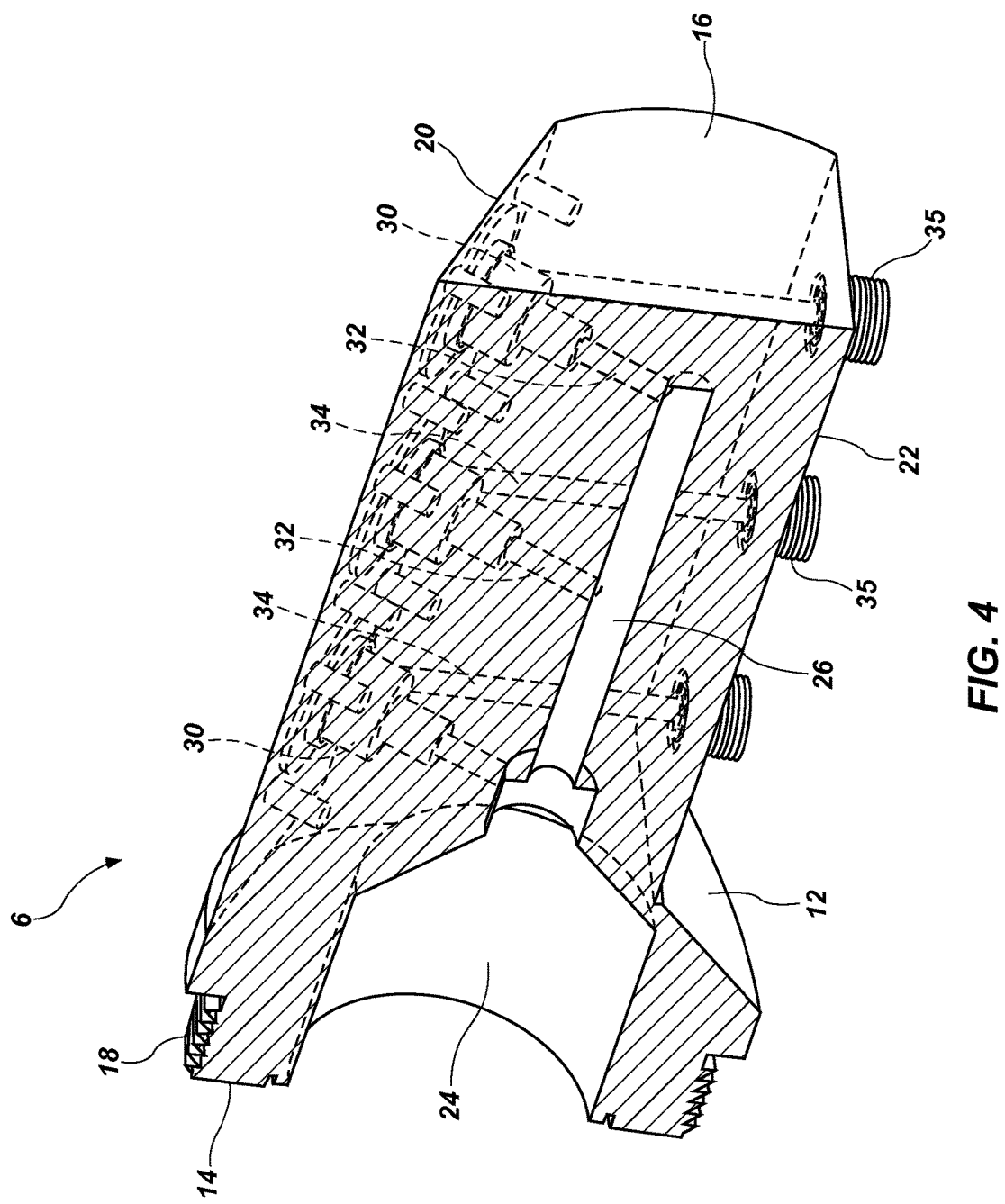
FIG. 4 illustrates a semi-transparent, partial cross-sectional perspective view of the manifold of FIG. 3.

Referring now to FIGS. 3 and 4, the manifold 6 may include a manifold body 12 having a proximal end 14 that is proximal to the pump unit 4 (FIGS. 1 and 2), and an opposite distal end 16 that is distal to the pump unit 4. The proximal end 14 may have an external threaded surface 18 for connection to a mating internal threaded surface of the pump unit 4. The manifold body 12 may also include a first major surface 20 and a second major surface 22 extending from the proximal end 14 to the distal end 16 of the body 12. The first major surface 20 may be located on a side of the body 12 opposite the second major surface 22. The proximal end 14 of the manifold body 12 may include a recess 24 for housing a portion of the pump. The manifold body 12 may define a central passage 26 extending distally from the recess 24 at the proximal end 14 of the body 12.

The first major surface 20 of the manifold body 12 may be configured to carry the plurality of valves 8 (FIGS. 1 and 2) thereon. The first major surface 20 may be canted in a convex V-block configuration to facilitate operation of the plurality of valves 8. A first canted portion 20a of the first major surface 20 and a second canted portion 20b of the first major surface 20 may be positioned to define an angle α therebetween in the range of about 90° to about 160°. However, it is to be appreciated that in alternative embodiments, the first major surface 20 may not be canted, but instead may be substantially planar. With reference to FIG. 3, the manifold body 12 may include a plurality of valve landing surfaces 28 recessed from the first and second canted portions 20a, 20b of the first major surface 20 of the manifold body 12. Each of the valve landing surfaces 28 may correspond to a valve of the plurality of valves 8. The manifold body 12 may include a total of six (6) valve landing surfaces 28 recessed from the first and second canted portions 20a, 20b of the first major surface 20 of the manifold body 12, wherein three (3) valve landing surfaces 28 are recessed from the first canted portion 20a and an additional three (3) valve landing surfaces 28 are recessed from the second canted portion 20b. A plurality of internally threaded blind boreholes 29 may be formed in the first major surface 20 of the manifold body 12 surrounding each of the valve landing surfaces 28. The boreholes 29 may be configured to receive bolts or other fasteners therein for fastening a valve of the plurality of valves 8 to the first major surface 20 of the manifold body 12. A valve chamber 30 may extend into the manifold body 12 from each valve landing surface 28. Each valve chamber 30 may be configured to house a valve head therein, as discussed in more detail below. The pump may have a single central passage 26 extending into the manifold body 12 that feeds six (6) intermediate passages 32 defined in the manifold body 12. The intermediate passages 32 may extend outwardly from the central passage 26 to corresponding valve chambers 30. Each intermediate passage 32 may extend outwardly from the central passage 26 in a linear manner. Additionally, each intermediate passage 32 may extend orthogonally with respect to one of the first and second canted portions 20a, 20b of the first major surface 20 of the manifold body 12. As shown in FIG. 3, the intermediate passages 32 extending outwardly from the central passage 26 to corresponding valve chambers 30 may form a V-shape with respect to one another when viewed from the distal end 16 of the manifold body 12.

An outer passage 34 may extend from each valve chamber 30 to a stem 35 extending outwardly from the second major surface 22 of the manifold body 12. Each outer passage 34 may extend linearly from the corresponding valve chamber 30 to the second major surface 22 of the manifold body 12. Additionally, each outer passage 34 may extend orthogonally from the second major surface 22 of the manifold body 12. Each stem 35 may have an outer threaded surface for connecting to a threaded connector of a flow tube (not shown) for directing the fluid discharged from the corresponding discharge port 34 to a desired location. Fluid pressurized and discharged by the pump may flow through the central passage 26 and into each of the six (6) intermediate passages 32 defined in the manifold body 12. From the intermediate passages 32, the fluid may then flow into the corresponding valve chambers 30 and subsequently into the corresponding outer passages 34. Fluid communication between each intermediate passage 32 and each corresponding outer passage 34 may thus be controlled by a valve head in the valve chamber 30 connecting the corresponding intermediate passage 32 and the corresponding outer passage 34.

While the manifold body 12 of FIG. 3 is shown to define a total of six (6) corresponding intermediate passages 32, valve chambers 30 and outer passages 34, it is to be appreciated that, in other embodiments, the manifold body 12 may define and include any number of corresponding intermediate passages 32, valve chambers 30 and outer passages 34. For example, in some embodiments, the manifold body 12 may define two (2) intermediate passages 32 extending from the central passage 26 to two (2) corresponding valve chambers 30 defined in the manifold body 12, as well as two (2) outer passages 34 extending from the corresponding valve chambers 30 to the second major surface 22 of the manifold body 12. In other embodiments, the manifold body 12 may define three (3) intermediate passages 32 extending from the central passage 26 to three (3) corresponding valve chambers 30 defined in the manifold body 12, as well as three (3) outer passages 34 extending from the corresponding valve chambers 30 to the second major surface 22 of the manifold body 12. In yet other embodiments, the manifold body 12 may define four (4) intermediate passages 32 extending from the central passage 26 to four (4) corresponding valve chambers 30 defined in the manifold body 12, as well as four (4) outer passages 34 extending from the corresponding valve chambers 30 to the second major surface 22 of the manifold body 12. In further embodiments, the manifold body 12 may define five (5) intermediate passages 32 extending from the central passage 26 to five (5) corresponding valve chambers 30 defined in the manifold body 12, as well as five (5) outer passages 34 extending from the corresponding valve chambers 30 to the second major surface 22 of the manifold body 12. In yet further embodiments, the manifold body 12 may define more than six (6) intermediate passages 32 extending from the central passage 26 to an equivalent number of corresponding valve chambers 30 defined in the manifold body 12, as well as an equivalent number of outer passages 34 extending from the corresponding valve chambers 30 to the second major surface 22 of the manifold body 12.

The manifold body 12 may be formed of polytetrafluoroethylene (PTFE), causing the passages of the manifold body 12, including the central passage 26, the intermediate passages 32, the valve chambers 30 and the outer passages 34, to be substantially immune to chemical attack by acids and other chemicals, enabling the metering pump assembly 2 (FIGS. 1 and 2) to be used in ultra-high purity applications. Alternatively, inner surfaces of one or more of the central passage 26, the intermediate passages 32, the valve chambers 30 and the outer passages 34 may be lined with PTFE. In yet other embodiments, the manifold body 12 may be formed of perfluoroalkoxy (PFA) or any other fluoropolymer or a combination thereof. In yet other embodiments, inner surfaces of one or more of the central passage 26, the intermediate passages 32, the valve chambers 30 and the outer passages 34 may be lined with a perfluoroalkoxy (PFA) or any other fluoropolymer or a combination thereof. By way of non-limiting example, the inner surfaces of each of the central passage 26, the intermediate passages 32, the valve chambers 30 and the outer passages 34 may be 100% PTFE. It is to be appreciated that the manifold body 12, or portions thereof lining the inner surfaces of one or more of the central passage 26, the intermediate passages 32, the valve chambers 30 and the outer passages 34, may comprise other materials, which materials may be selected in response to the type of fluid(s) being dispensed by the metering pump assembly 2 or applications for which the metering pump assembly 2 is being utilized.

As a non-limiting example, the manifold body 12 may be formed by an injection molding process. In some embodiments, the shape of the mold and/or mold inserts may define one or more of the recess 24, the central passage 26, the intermediate passages 32, the valve chambers 30 and the outer passages 34 of the manifold body 12 as the manifold body 12 is molded in a mold cavity within the mold. In other embodiments, a blank for the manifold body 12 may be formed by an injection molding, an extrusion, or a casting process, and one or more of the central passage 26, the intermediate passages 32, the valve chambers 30 and the outer passages 34 of the manifold body 12 may be subsequently machined into the blank of the manifold body. In such embodiments, the central passage 26, the intermediate passages 32, the valve chambers 30 and the outer passages 34 of the manifold body 12 may be formed by one or more of a drilling process, a turning process, and a milling process. Additionally, in such embodiments, the valve landing surfaces 28 may be formed in the manifold body 12 by a milling process. Furthermore, the boreholes 29 may be formed by a drilling process subsequent to the manifold body 12 being molded. Threads on the inner surface of the boreholes 29 may be formed by a conventional tapping process. In other embodiments, the manifold body 12 may be formed by other techniques. It is to be appreciated that any method of forming the manifold body 12 is considered to be within the scope of the embodiments disclosed herein.

Figure 5:
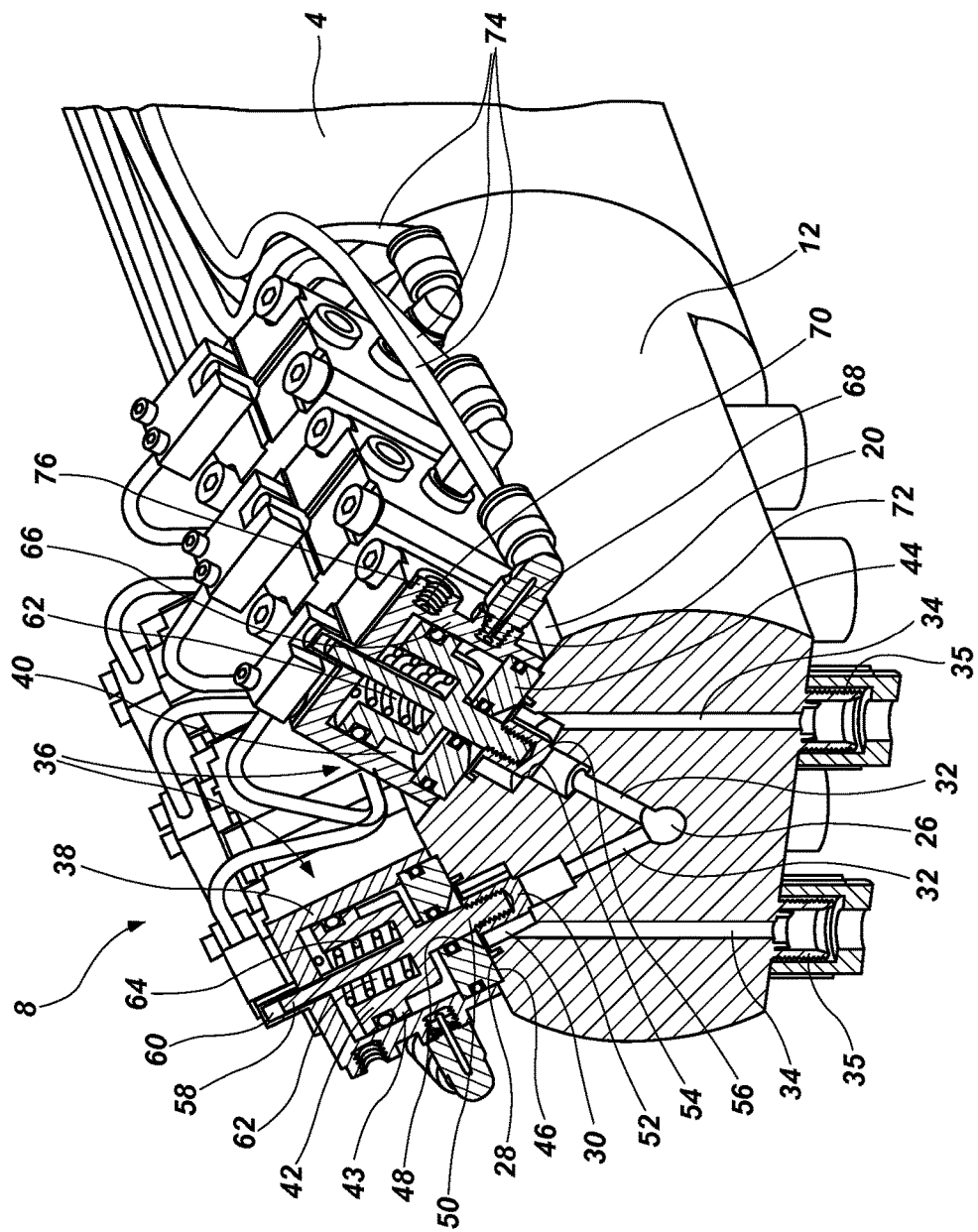
FIG. 5 illustrates a partial, cut-away perspective view of the metering pump assembly of FIGS. 1 and 2, showing a valve assembly, according to an embodiment of the present disclosure.

FIG. 5 illustrates the plurality of valves 8, each comprising a valve assembly 36 attached to the first major surface 20 of the manifold body 12. Each valve assembly 36 may include a valve housing 38 defining a cylinder 40 therein and containing a piston 42 within the cylinder 40. The piston 42 may include a piston head 43 configured to be actuated by a pneumatic force. A base member 44 of the valve assembly 36 may be coupled to a bottom portion of the valve housing 38. The base member 44 may have a bottom surface 46 abutting the corresponding valve landing surface 28 recessed from the first major surface 20 of the manifold body 12. The base member 44 may have a central aperture 48 through which a lower stem 50 of the piston 42 extends. A plug head 52 may be threadedly coupled to a lowermost portion of the lower stem 50 of the piston 42. An edge of the manifold body 12, defined between a bottom surface of the valve chamber 30 and an inner surface of the output passage 32 extending into the manifold body 12 from the valve chamber 30, may form a valve seat 54. The plug head 52 may have a beveled surface 56 configured to sealingly engage the valve seat 54 when the valve 8 is in the closed position, as shown in FIG. 5. The piston 42 may include an upper stem 58 extending into an upper guide cylinder 60 of the valve housing 38. The piston 42 may include a cylindrical cavity 62 surrounding a lower portion of the upper stem 58. A biasing spring 64 may extend from an upper surface of the valve housing 38 to a bottom surface of the cylindrical cavity 62 of the piston 42, biasing the piston 42 downward such that the plug head 52 attached to the lower-most portion of the lower stem 50 of the piston 42 is biased into a sealing engagement with the valve seat 54.

The valve housing 38 may include a sidewall 66 having an intake port 68 and an exhaust port 70 extending therethrough and located between an upper limit of movement of the piston head 43 and a lower limit of movement of the piston head 43. The sidewall 66 of each valve housing 38 may include a first threaded stem 72 surrounding the intake port 68 to facilitate connection of a pneumatic supply line 74 to the intake port 68. The pneumatic supply line 74 may extend from the first threaded stem 72 of the sidewall 66 of the valve housing 38 to the valve control unit 10 (see FIG. 6). The sidewall 66 of the valve housing 38 may also include a second threaded stem 76 surrounding the exhaust port 70 to facilitate connection of an optional pneumatic exhaust line (not shown) to the exhaust port 70. During operation of a valve assembly 36, the biasing spring 64 may bias the piston 42 downward to close the valve assembly 36, as previously described. When it is desired to open the valve assembly 36 to allow passage of fluid from the intermediate passage 32 (corresponding to the valve assembly 36) to the outer passage 34, pneumatic fluid, such as, by way of non-limiting example, compressed air, as controlled by operation of the valve control unit 10, may be directed from the pneumatic supply line 74 and through the intake port 68 into the cylinder 40. The pressure of the pneumatic fluid in the cylinder 40 exerts a force against a bottom surface of the piston head 43, forcing the piston 42 upward and causing the plug head 52 to separate from the valve seat 54, allowing fluid pressurized by and discharged from the pump to flow from the intermediate passage 32 into the valve chamber 30 and subsequently into the outer passage 34. The pressurized fluid may subsequently exit the outer passage 34 through the outlet stem 35. Other pneumatic fluids may be also used to actuate the valves 36 including, by way of non-limiting example, compressed, purified nitrogen and compressed argon.

In other embodiments, the valves 36 of the plurality of valves 8 may comprise electronically-operated, electromagnetically-operated, and/or electromechanically-operated valve assemblies. For example, by way of non-limiting example, the valves 36 of the plurality of valves 8 may comprise solenoid-actuated valve assemblies.

It is to be appreciated that, in additional embodiments, the manifold body 12 may be configured differently from that shown in FIGS. 1 through 4. For example, the relative locations of the valves 8, the output passages 32 and the discharge ports 34 may be adjusted to fit any particular application in which the metering pump assembly 2 is to be utilized.

Figure 6:
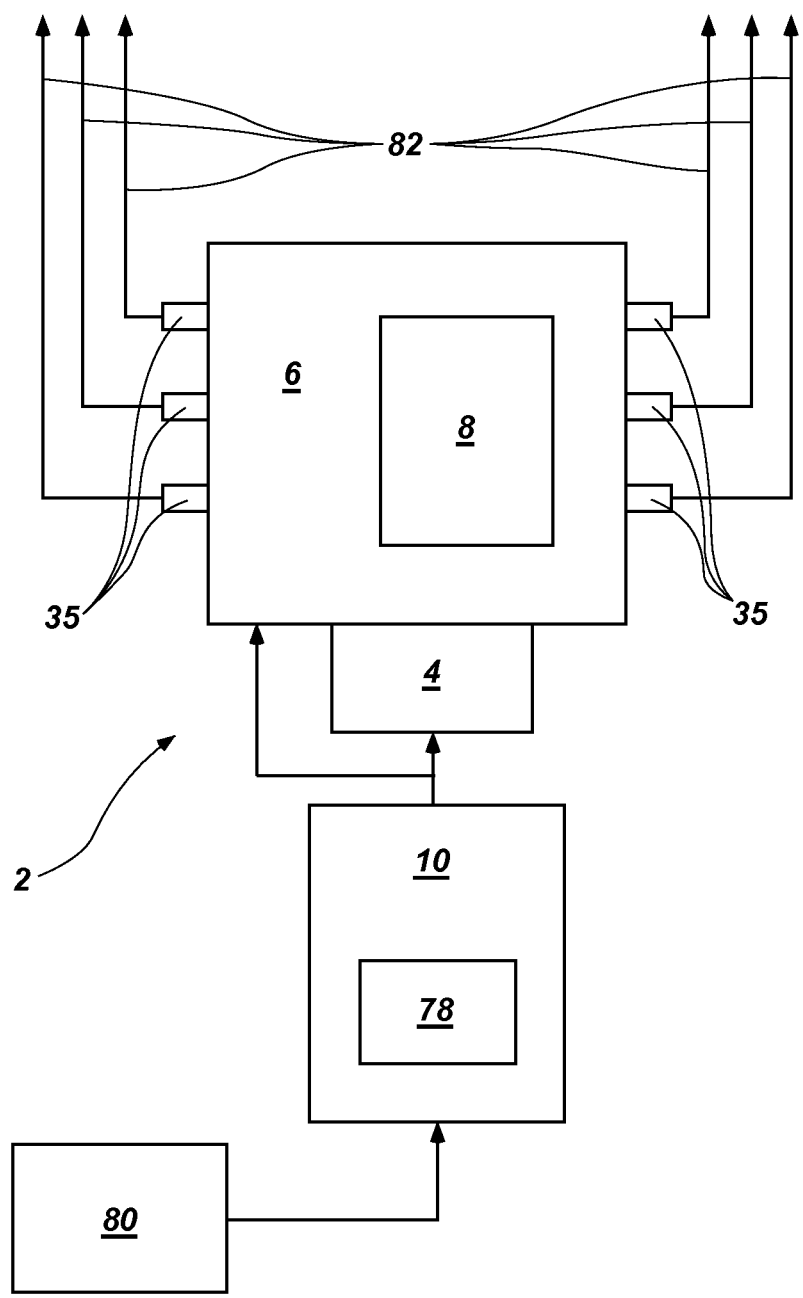
FIG. 6 is a simplified schematic diagram illustrating the metering pump assembly including an electronic interface, according to an embodiment of the present disclosure.

FIG. 6 is a simplified schematic diagram of the metering pump assembly 2. The valve control unit 10 may include an electronic controller 78. The electronic controller 78 may be a microcontroller located on the valve control unit 10. Alternatively, the electronic controller 78 may be located remotely from the valve control unit 10. In such alternative embodiments, a wire or cable may extend from the valve control unit 10 to the electronic controller 78, or the valve control unit 10 may communicate wirelessly with the electronic controller 78. The electronic controller 78 may be a programmable logic controller (PLC). The electronic controller 78 may be configured to selectively and independently control individual operation of each valve assembly 36 of the plurality of valves 8. For example, the electronic controller 78 may be configured to open each of the valve assemblies 36 in a manner to dispense a volume of fluid ranging from as small as about 0.1 ml or less and as large as about 100 ml or more, or any volume therebetween, from a single corresponding outer passage 34. It is to be appreciated that the volume and/or flow rate of fluid dispensed may be adjusted by adjusting parameters of the pump unit 4. Moreover, the electronic controller 78 may be configured to vary the duration of which a valve assembly 36 is open to control the amount of fluid being dispensed from the corresponding outer passage 34. Additionally, the electronic controller 78 may be configured to operate the valve assemblies 36 of the plurality of valves 8 simultaneously or in sequence. In this manner, the electronic controller 78 may individually and simultaneously control the amount of fluid dispensed from each outer passage 34 of the metering pump assembly 2. Accordingly, the electronic controller 78 provides that precise, predetermined volumes of fluid may be delivered, as needed, from the metering pump assembly 2 to specific destinations of a fluid system attached thereto through flow tubes 82 connected to the stems 35 of the outer passages 34.

The electronic controller 78 may be in communication with an electronic interface 80. The electronic controller 78 may communicate with the electronic interface 80 by a wired connection or by wireless transmission. The electronic interface 80 may include touch screen controls, or, alternatively, may include a personal computer (PC) based computing platform. The electronic interface 80 may be configured to allow a user to input selections relating to when each valve 36 of the plurality of valves 8 will open to dispense a volume of fluid from the corresponding outer passage 34. The electronic interface 80 may also be configured to enable a user to select the amount of volume of fluid to discharge from each outer passage 34. Additionally, the electronic interface 80 may be configured to, in combination with electronic controller 78, enable a user to select sequences of fluid discharges through each of the valve assemblies 36 and flow tubes 82 connected to the stems 35 of the corresponding outer passages 34, each discharge of the sequence having a user pre-selected timing and discharge volume amount. Further, the electronic interface 80 may be configured to enable a user to input commands instructing the electronic controller 78 regarding when to open each valve assembly 36 of the plurality of valves 8 and the fluid volume amount of each discharge.

Figure 7:
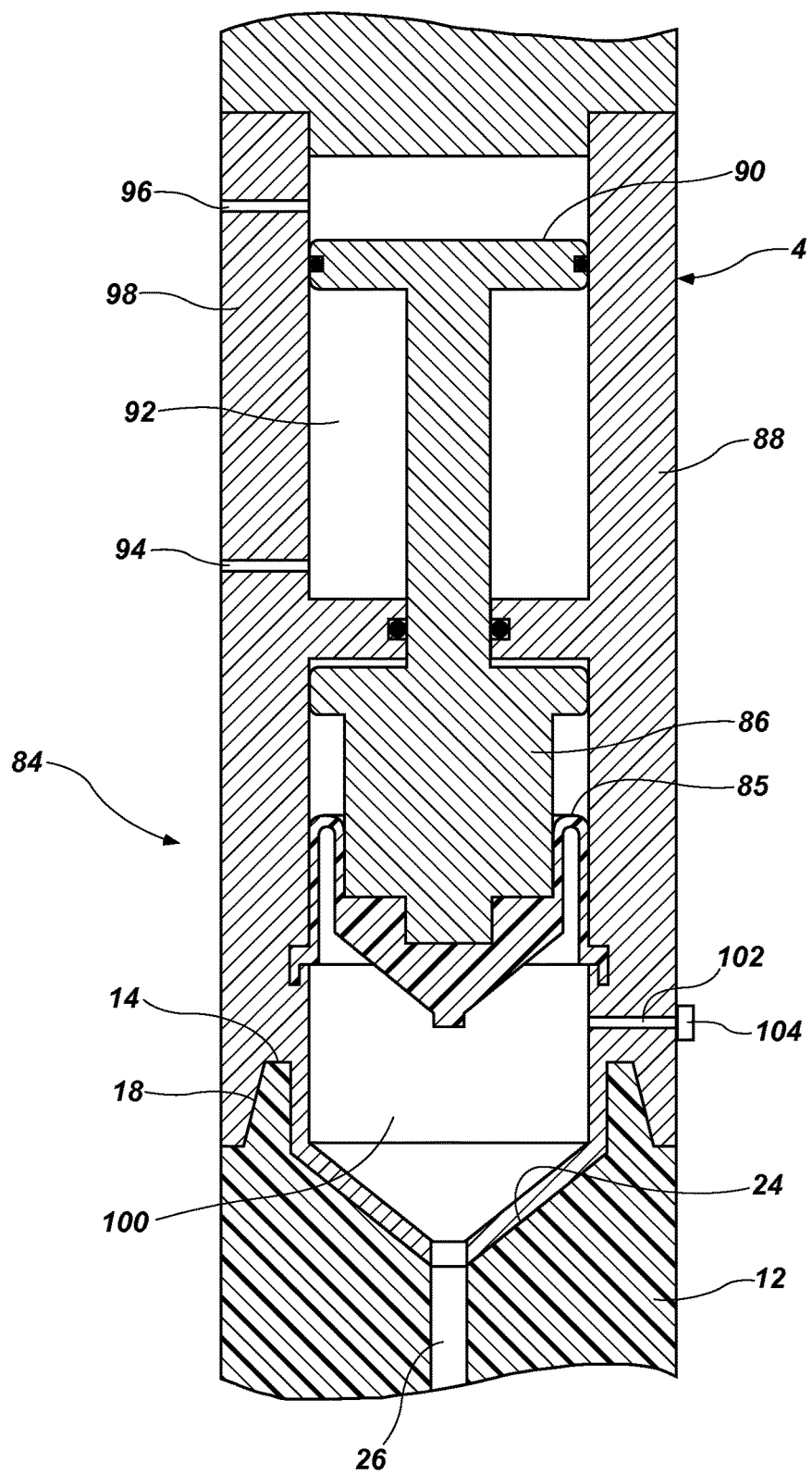
FIG. 7 illustrates a partial cross-sectional view of a metering pump, according to an embodiment of the present disclosure.

FIG. 7 illustrates an example of a metering pump 84 that may be utilized in the pump unit 4. Depicted is a partial cross-sectional view of the proximal end 14 of the manifold body 12 coupled to the metering pump 84. The metering pump 84 may be a rolling diaphragm pump including a rolling diaphragm 85 coupled to a reciprocating pump element 86 within a housing 88 of the pump unit 4. The reciprocating pump element 86 may include a pump piston 90 at a proximal end of the reciprocating pump element 86. The pump piston 90 may be located in a cylinder 92 between a first port 94 and a second port 96 extending through a wall 98 of the cylinder 92. Pneumatic fluid, such as pressurized air, alternately flowing into and out of the cylinder 92 on either side of the pump piston 90 through the first and second ports 94, 96 in the cylinder wall 98 cause the reciprocating pump element 86 to reciprocate in a controlled manner. The rolling diaphragm 85 and the reciprocating pump element 86 may reciprocate within a pressurizing chamber 100 defined in the housing 88. An inlet 102 may extend through the housing 88 and may be in fluid communication with a fluid supply (not shown). A valve element 104 may be located at the inlet 102 to enable flow of fluid into the pressurizing chamber 100 from the supply during an intake stroke and to restrict flow of fluid out of the pressurizing chamber 100 through the inlet 102 during an output stroke. The metering pump 84 may include an adjustable stroke limiter, such as an adjustable bolt or screw, configured to allow a user to adjust the volume of fluid dispensed by each stroke of the reciprocating pump element 86. The adjustable stroke limiter may be adjusted manually or by control from the electronic controller 78 (FIG. 6). The electronic controller 78 may also be programmed through electronic interface 80 (FIG. 6) to control a stroke speed of the reciprocating pump element 86. The output volume and flow rate of fluid dispensed from the metering pump 84 may be adjusted by adjusting any of a number of parameters of the metering pump, such as, by way of non-limiting example, the reciprocation rate of the pump element 86, the stroke length of the pump element 86, the volume of the pressurizing chamber 100 and the size of the rolling diaphragm 85. It is to be appreciated that, while FIG. 7 illustrates a rolling diaphragm metering pump, other types of metering pumps may be utilized with the metering pump assembly 2 (FIGS. 1, 2, and 6) disclosed herein, such as other piston-type pumps, diaphragm-type pumps, gear-type pumps, peristaltic pumps and combinations thereof.

In the embodiments illustrated in FIGS. 1, 2 and 5-7, the pump unit 4 is shown attached to the proximal end 14 of the manifold body 12 so that the pump discharges pressurized fluid into the central passage 26, which fluid flows therefrom into the intermediate passages 32. However, it is to be appreciated that, in other embodiments, the pump unit 4 may be located at the second major surface 22 of the manifold body 12 and coupled to any one of the outer passages 34 so that the pump may discharge pressurized fluid directly into any one of the outer passages 34. In such embodiments, the electronic interface 80 may be configured to allow a user to designate the particular outer passage 34 to which the pump is connected as a "supply" passage and the remaining outer passages 34 as "discharge" passages. In such embodiments, a stopper or other occluding element may be located in the recess 24 of the manifold body 12 to prevent pressurized fluid from escaping from the proximal end 14 of the manifold body 12. In such embodiments, the electronic controller 78 may control the plurality of valves 8 in the same manner as previously described to selectively control discharge of fluid from the individual outer passages 34 to which the pump is not connected. Alternatively, the plurality of valves 8 may include an additional valve disposed in the central passage 26 of the manifold body 12 and located proximate the proximate-most intermediate passage 32 to selectively control discharge of fluid from a proximal end of the central passage 26. In this additional embodiment, the electronic interface 80 may be configured to allow a user to designate the remaining outer passages 34, as well as the proximate end of the central passage 26, as "discharge" passages. The electronic controller 78 may control the plurality of valves 8, including the additional valve, in the same manner previously described to selectively control discharge of fluid from the individual outer passages 34 to which the pump is not connected and the proximal end of the central passage 26. It is to be appreciated that the manifold body 12 may be configured so that the pump may be connected to the central passage 26 or any one of the outer passages 34, providing a user with a multiplicity of options to tailor the pump assembly 2 to a particular application. In this manner, the central passage 26 and each of the outer passages 34 may be an inlet, an outlet, or both.

While certain illustrative embodiments have been described in connection with the figures, those of ordinary skill in the art will recognize and appreciate that the scope of this disclosure is not limited to those embodiments explicitly shown and described herein. Rather, many additions, deletions, and modifications to the embodiments described herein may be made to produce embodiments within the scope of this disclosure, such as those hereinafter claimed, including legal equivalents. In addition, features from one disclosed embodiment may be combined with features of another disclosed embodiment while still being within the scope of this disclosure, as contemplated by the inventors.

What is claimed is:

1. A multi-port metering pump assembly, comprising:
   a metering pump comprising an inlet and a pressurizing chamber in fluid communication with the inlet, the pressurizing chamber configured to pressurize fluid therein;
   a manifold comprising an integral unitary body coupled to the metering pump, wherein:
      the manifold has a longitudinal axis with a proximal end and a distal end, the proximal end attached to the pressurizing chamber, and the manifold has a first surface and a second surface parallel to the longitudinal axis and a third surface opposing the first and second surfaces;
      the integral unitary body defines a central passage having a first end thereof in fluid communication with the pressurizing chamber to receive pressurized fluid and a second end thereof terminating within the integral unitary body;
      the integral unitary body defines a first set of intermediate passages distributed between the first and second ends of the central passage and extending away therefrom in a first direction and a second set of intermediate passages distributed between the first and second ends of the central passage and extending away therefrom in a second, different direction; and
      each intermediate passage establishes fluid communication between the central passage and a corresponding outer passage of the manifold integral unitary body;
   a plurality of valves coupled to the manifold, each valve of the plurality of valves being located on the first and second surfaces of the manifold and located between an intermediate passage of one of the first and second sets of intermediate passages and a corresponding outer passage, each valve configured to enable and prevent passage of fluid pressurized by the metering pump between corresponding intermediate and outer passages;
   a plurality of outlet stems coupled to the manifold, each outlet stem of the plurality of outlet stems being located on the third surface of the manifold and located adjacent a corresponding outer passage, each outer passage extending linearly from the first and second surfaces to the third surface of the manifold; and
   an electronic controller coupled to the plurality of valves, the electronic controller having an associated electronic interface, the electronic controller programmed to selectively and independently open and close the valves of the plurality of valves.

2. The multi-port metering pump assembly of claim 1, wherein the plurality of valves is pneumatically operated.

3. The multi-port metering pump assembly of claim 1, wherein the plurality of valves is electrically operated.

4. The multi-port metering pump assembly of claim 1, wherein the electronic controller is a programmable logic controller.

5. The multi-port metering pump assembly of claim 1, wherein an inner surface of the central passage and at least portions of inner surfaces of the first and second sets of intermediate passages comprise at least one of polytetrafluoroethylene polytetrafluoroethylene, perfluoroalkoxy, and any other fluoropolymer.

6. The multi-port metering pump assembly of claim 1, wherein the metering pump comprises a rolling-diaphragm pump.

7. The multi-port metering pump assembly of claim 1, wherein each of the first and second sets of intermediate passages comprises three or more intermediate passages, the plurality of valves comprises six or more valves, and the outer passages comprise six or more outer passages.

8. The multi-port metering pump assembly of claim 1, wherein the electronic controller, the manifold and each valve of the plurality of valves are configured, in combination, to dispense a volume of fluid of about 0.1 mL or less from any of at least one of the central passage and the outer passages.

9. The multi-port metering pump assembly of claim 8, wherein the electronic controller is programmable to operate each valve of the plurality of valves simultaneously or in sequence.

10. The multi-port metering pump assembly of claim 9, wherein the electronic controller is programmable to vary the duration in which each valve of the plurality of valves is open to dispense varying volumes of fluid from the at least one of the central passage and the outer passages.

11. The multi-port metering pump assembly of claim 1, wherein the metering pump is connected to the central passage so that pressurized fluid discharged from the metering pump enters the central passage and thereafter enters one of the first and second sets of intermediate passages.

12. The multi-port metering pump assembly of claim 1, wherein the first surface and the second surface of the manifold further comprise a first canted portion and a second canted portion of the manifold.

13. A method of manufacturing a multi-port metering pump assembly, comprising:
   forming a manifold, comprising:
      providing an integral unitary body;
      after providing the integral unitary body, machining a central passage in the integral unitary body, machining a first set of intermediate passages, machining a second set of intermediate passages, and machining outer passages extending linearly from a first surface and a second surface to a third surface opposing the first and second surfaces;
      wherein the first set of intermediate passages is distributed between a first end and a second, opposite end of the central passage and extends away therefrom in a first direction, the second set of intermediate passages is distributed between the first and second ends of the central passage and extends away therefrom in a second, different direction, and each intermediate passage provides fluid communication between the central passage and a corresponding outer passage;
   coupling the manifold to a metering pump, such that a pressurizing chamber of the metering pump is in fluid communication with a first end of the central passage through an inlet;
   attaching valves to the manifold between each intermediate passage and a corresponding outer passage, each valve located on the first and second surfaces of the manifold and configured to enable and prevent passage of fluid pressurized by the metering pump between corresponding intermediate and outer passages;

providing outlet stems, each outlet stem located on the third surface of the manifold adjacent a corresponding outer passage; and operably coupling an electronic controller having an associated electronic interface to each valve, the electronic controller programmable to selectively and independently open and close the valves.

14. The method of claim 13, wherein attaching the valves to the manifold comprises attaching pneumatically operated valves to the manifold.

15. The method of claim 13, wherein attaching the valves to the manifold comprises attaching electrically operated valves to the manifold.

16. The method of claim 13, wherein the electronic controller is a programmable logic controller.

17. The method of claim 13, further comprising forming the integral unitary body to have an inner surface of the central passage and at least portions of inner surfaces of the first and second sets of intermediate passages comprising at least one of polytetrafluoroethylene, perfluoroalkoxy, and any other fluoropolymer.

18. The method of claim 13, wherein providing a metering pump comprises providing a rolling-diaphragm metering pump.

19. The method of claim 13, wherein each of the first and second sets of intermediate passages comprises three or more intermediate passages, the outer passages comprise six or more outer passages, and the valves comprise six or more valves.

20. The method of claim 13, wherein attaching the valves to the manifold further comprises locating a first set of valves on a first canted portion and locating a second set of valves on a second canted portion of the manifold.

* * * * *

UNITED STATES PATENT AND TRADEMARK OFFICE
CERTIFICATE OF CORRECTION

PATENT NO. : 9,605,669 B2  
APPLICATION NO. : 14/219861  
DATED : March 28, 2017  
INVENTOR(S) : Kenji Allen Kingsford et al.

Page 1 of 1

It is certified that error appears in the above-identified patent and that said Letters Patent is hereby corrected as shown below:

In the Claims  
Claim 1, Column 9, Line 39, change "the manifold integral" to --the integral--

Signed and Sealed this  
Twenty-sixth Day of December, 2017

Joseph Matal  
*Performing the Functions and Duties of the*  
*Under Secretary of Commerce for Intellectual Property and*  
*Director of the United States Patent and Trademark Office*